United States Patent
Wilson et al.

(10) Patent No.: US 9,418,099 B2
(45) Date of Patent: *Aug. 16, 2016

(54) DATA IMPROVEMENT SYSTEM AND METHOD

(71) Applicant: Wabtec Holding Corp., Wilmerding, PA (US)

(72) Inventors: M. Frank Wilson, Cedar Rapids, IA (US); Lee A. Olson, Cedar Rapids, PA (US); Matthew Schouten, Cedar Rapids, IA (US)

(73) Assignee: Wabtec Holding Corp., Wilmerding, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/679,861

(22) Filed: Apr. 6, 2015

(65) Prior Publication Data
US 2015/0213080 A1 Jul. 30, 2015

Related U.S. Application Data

(62) Division of application No. 12/986,482, filed on Jan. 7, 2011, now Pat. No. 9,002,545.

(51) Int. Cl.
| | |
|---|---|
| G05D 1/00 | (2006.01) |
| G06F 17/30 | (2006.01) |
| B61L 15/00 | (2006.01) |
| B61L 23/00 | (2006.01) |
| B61L 27/00 | (2006.01) |

(52) U.S. Cl.
CPC ....... *G06F 17/30371* (2013.01); *B61L 15/0072* (2013.01); *B61L 23/00* (2013.01); *B61L 27/0094* (2013.01); *G06F 17/30082* (2013.01); *G06F 17/30525* (2013.01); *G06F 17/30563* (2013.01); *G06F 17/30864* (2013.01)

(58) Field of Classification Search
USPC .......................................................... 701/19
See application file for complete search history.

(56) References Cited

U.S. PATENT DOCUMENTS

| | | |
|---|---|---|
| 5,012,413 A | 4/1991 | Sroka et al. |
| 5,787,815 A | 8/1998 | Andersson et al. |
| 5,791,063 A | 8/1998 | Kesler et al. |
| 5,867,404 A | 2/1999 | Bryan |
| 6,218,961 B1 | 4/2001 | Gross et al. |
| 6,347,265 B1 | 2/2002 | Bidaud |
| 6,373,403 B1 | 4/2002 | Korver et al. |
| 6,434,452 B1 | 8/2002 | Gray |
| 6,480,766 B2 | 11/2002 | Hawthorne et al. |
| 6,681,160 B2 | 1/2004 | Bidaud |
| 6,804,621 B1 | 10/2004 | Pedanckar |
| 7,014,146 B2 * | 3/2006 | Villaume ............. G05D 1/0083 244/111 |
| 7,027,966 B2 | 4/2006 | Klauder, Jr. |
| 7,050,926 B2 | 5/2006 | Theurer et al. |
| 7,130,753 B2 | 10/2006 | Pedanekar |
| 9,002,545 B2 * | 4/2015 | Wilson ................ B61L 15/0072 701/19 |
| 2005/0253926 A1 | 11/2005 | Chung et al. |
| 2006/0253233 A1 | 11/2006 | Metzger |

(Continued)

*Primary Examiner* — Hussein A. Elchanti
(74) *Attorney, Agent, or Firm* — The Webb Law Firm

(57) ABSTRACT

A data improvement system, including an initial database, a verification database, and a processing device in communication with the initial database and the verification database. The processing device receives data from the initial database and the verification database, and determines verification data based thereon. A track data improvement system and a track database improvement system are also disclosed.

22 Claims, 5 Drawing Sheets

(56) References Cited

U.S. PATENT DOCUMENTS

| | | |
|---|---|---|
| 2006/0253234 A1 | 11/2006 | Kane et al. |
| 2007/0021908 A1* | 1/2007 | Jaugilas ............ G01C 21/00 701/450 |
| 2008/0119970 A1* | 5/2008 | Campbell ......... G05D 1/0676 701/8 |
| 2009/0043435 A1 | 2/2009 | Kane et al. |
| 2009/0069960 A1* | 3/2009 | Lapp ............... G05D 1/0077 701/16 |
| 2009/0070031 A1 | 3/2009 | Ginsberg |
| 2010/0026551 A1 | 2/2010 | Szwilski et al. |
| 2010/0286896 A1 | 11/2010 | Yamada |
| 2015/0356873 A1* | 12/2015 | Kneuper ........... G08G 5/0021 701/439 |

* cited by examiner

DATA IMPROVEMENT SYSTEM AND METHOD

CROSS REFERENCE TO RELATED APPLICATIONS

This application is a divisional of U.S. patent application Ser. No. 12/986,482, filed Jan. 7, 2011, which is incorporated herein by reference in its entirety.

BACKGROUND OF THE INVENTION

1. Field of the Invention

The present invention relates generally to vehicle management and control systems, such as train management and control systems in the railroad industry, and in particular to a data improvement system and method for use in creating, managing, and/or validating data and information associated with a track network and/or a vehicle, such as a train, operating within that network.

2. Description of the Related Art

In the field of train management and control, it is critical to collect and obtain as much data and information as possible to assist in safely and effectively managing trains operating in a complex track network. Accordingly, accuracy of data associated with the track layout and the trains operating thereon is an important aspect, especially in train control systems, such as a Positive Train Control (PTC) system or the like.

Track layout (in the x-, y-, and z-directions) must be established, so that the train operator, as well as the central control system (e.g., central dispatch), understands the track direction and contour. In addition, the general position of certain features, such as crossings, sidings, etc., should also be obtained and updated to ensure the safety of both the train operators and the pedestrians. In this regard, a track is normally divided into segments or "blocks", where each individual segment is managed and controlled so that multiple trains operating on the same length of track in the network are operated in a safe and effective manner. As is known, all of this information must be established and a track database created.

Various methods exist for establishing the initial track layout, including a Global Positioning System (GPS), a Geographic Information System (GIS), survey techniques, and other track data collection systems. Once created, this track database is installed at the central control system (or central dispatch) and on each train operating under the control of central dispatch. There are, however, limitations in how much data should realistically be included in a database that is maintained on each individual train; how quickly and effectively such a track database can be processed and created; and the processing speeds of the components of the on-board controllers (OBC) on the train. Further, and based upon the use of the track layout information, only a portion or subset of the data may be required in any particular application. Therefore, there remains a need in the art of an effective system and method of creating and/or improving the initial track data for use in a track database that can be used in a variety of applications.

In addition, the initial creation of the track database may include data that is incorrect, either based upon the collection technique or through subsequent processing. Regardless, and as is known, an operator may notice deviations or errors between how and where the train is operating with respect to the information in the track database. Accordingly, there remains a need in the art to analyze and process the initial data, and based upon additional data collection, provide improved track data. As discussed above, accuracy of this track data is critical to safe and effective train operation.

Still further, the operating parameters of a train, whether individually or in a group, can be tracked and analyzed. While it is known to track certain train parameters for use in controlling the train during operation, it is realized herein that these and other train operating parameters may be used in a data improvement system to better understand and identify specific issues relating to specific trains or groups of trains. Accordingly, there remains a need in the art to analyze and process train operating data to provide improved train data.

Safe train operation is critical in the railroad industry and train management and control is used to ensure such safety. However, the effectiveness of such a train management system is limited by the data used in the implementation process. Therefore, accurate track data and train data is important in all aspects of train management and control, and improvement of such data will only lead to better decision-making at the central control system level, as well as at the operator level.

SUMMARY OF THE INVENTION

Accordingly and generally, the present invention provides a data improvement system and method that addresses or overcomes some or all of the deficiencies and drawbacks associated with the prior art system in the railroad industry. Preferably, the present invention provides a data improvement system and method that provides initial track data for use in the creation of an accurate track database. Preferably, the present invention provides a data improvement system and method that provides track data and/or train data for use in improving the existing data, which leads to safe train operation and management. Preferably, the present invention provides a data improvement system and method that provides track data and/or train data that can be utilized in variety of train-related applications and environments.

In one preferred and non-limiting embodiment, the present invention provides a data improvement system, including: an initial database comprising a plurality of data fields representing initial data, which includes at least one of the following: track data, identification data, location data, position data, heading data, curvature data, type data, grade data, coordinate data, cross track error data, centerline data, initial modeling data, positioning system data, geographic information system data, time data, log data, prediction data, feature data, train data, collected data, dynamic data, batch data or any combination thereof; a verification database comprising a plurality of data fields representing subsequent data, which includes at least one of the following: track data, identification data, location data, position data, heading data, curvature data, type data, grade data, coordinate data, cross track error data, centerline data, initial modeling data, positioning system data, geographic information system data, time data, log data, prediction data, feature data, train data, collected data, dynamic data, batch data or any combination thereof; and a processing device in communication with the initial database and the verification database. The processing device is configured or adapted to: receive at least one data field from the initial database and at least one data field from the verification database; and determine verification data based upon the at least one data field from the initial database and the at least one data field from the verification database. The verification data includes at least one of the following: error data, correction data, flagged data, corrected track data, corrected train data, or any combination thereof.

In another preferred and non-limiting embodiment, the present invention provides a track data improvement system, including: an initial database comprising a plurality of data fields representing initial track data; a verification database comprising a plurality of data fields representing subsequent track data; and a processing device in communication with the initial database and the verification, database. The processing device is configured or adapted to: receive at least one data field from the initial database and at least one data field from the verification database; and determine error data based upon a comparison of the initial track position data and the subsequent track position data.

In a further preferred and non-limiting embodiment, the present invention provides a track database data improvement system, including: a source data database comprising a plurality of data fields representing source data, which includes at least one of the following: track data, identification data, location data, position data, heading data, curvature data, type data, grade data, coordinate data, cross track error data, centerline data, positioning system data, geographic information system data, survey data, log data, dynamic data, batch data, or any combination thereof; and a processing device in communication with the source data database. The processing device is configured or adapted to: determine initial track data for a specified segment of track based at least in part upon the source data, the segment having end points; determine error data based upon the track data and a straight line between the end points, and create intermediate segments as defined as a straight line between the intermediate end points; determine trimming data for at least two of the intermediate end points, thereby defining trimmed track segments; and provide at least a portion of the trimming data to a track database. The trimming data includes at least one of the following: first end point data, second end point data, coordinate data, heading data, grade data, linear distance data, track type data, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
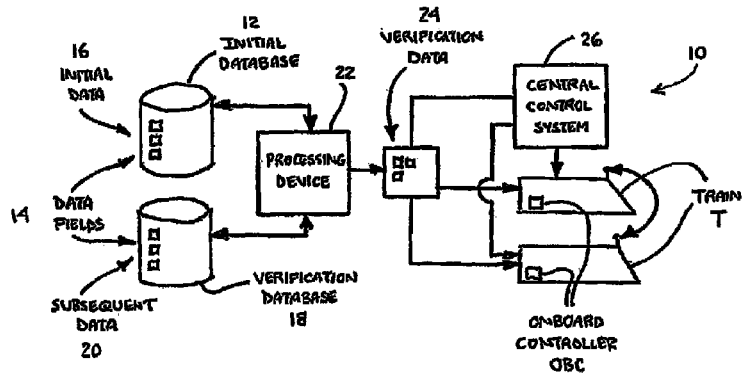
FIG. 1 is a schematic view of one embodiment of a data improvement system and method according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

The present invention may be implemented on one or more computers, computing devices, or computing systems. Such computers include the necessary hardware, components, internal and external devices, and/or software to implement one or more of the various steps and processes discussed hereinafter, including, but not limited to, data capture, processing, and communication in a network environment. Further, one or more of the computers of the computing system may include program instructions and/or particular, specialized programs to effectively implement one or more of the steps of the present invention. Still further, one or more of the modules or portions of these program instructions (or code) can be stored on or implemented using known articles and physical media.

The present invention is directed to a data improvement system 10 and method, which are illustrated in various preferred and non-limiting embodiments and environments in FIGS. 1-11. In one preferred and non-limiting embodiment, and as illustrated schematically in FIG. 1, the data improvement system 10 includes an initial database 12 that includes multiple data fields 14 that at least partially represent initial data 16. This initial data 16 includes one or more of the following data points and types: track data, identification data, location data, position data, heading data, curvature data, type data, grade data, coordinate data, cross track error data, centerline data, initial modeling data, positioning system data, geographic information system data, time data, log data, prediction data, feature data, train data, collected data, dynamic data, batch data, or any combination thereof. In addition, the system 10 includes a verification database 18, which also includes or is populated with multiple data fields 14. The data fields 14 in this database 18 represent subsequent data 20, which includes one or more of the following data points or types: track data, identification data, location data, position data, heading data, curvature data, type data, grade data, coordinate data, cross track error data, centerline data, initial modeling data, positioning system data, geographic information system data, time data, log data, prediction data, feature data, train data, collected data, dynamic data, batch data, or any combination thereof.

In this embodiment, the system 10 further includes a processing device 22 that is in communication with the initial database 12 and the verification database 18. This processing device 22 may be a computer, a computing device, a computing system, or the like, and may be located at or remote from the data collection points. In addition, this processing device 22 is programmed or configured to receive at least one data field 14 from the initial database 12 and at least one data field 14 from the verification database 18. The processing device 22 is also configured or programmed to determine verification data 24 based upon the received and analyzed data fields 14. This verification data 24 may include one or more of the following: error data, correction data, flagged data, corrected track data, corrected train data, or any combination thereof.

As also seen in FIG. 1, the system 10 is implemented to verify or improve existing track data associated with a railroad track in a complex track network. Accordingly, and based upon the verification data 24 (or some other process or determined data (as discussed hereinafter)), the processing device 22 may be in communication with a central control system 26 and/or one or more trains T that are traveling or set to travel on a track TR within a complex track network. The central control system 26 may also take the form of the central dispatch location or computing system, as is known in the art, where this central control system 26 may also act as the conduit to and be in communication with one or more of the trains T.

Accordingly, in one embodiment, the initial database represents initial data 16 that has been previously collected, processed, or created for use in modeling a track TR in the track network. However, as discussed above, when certain errors arise or propagate, this initial data 16 (which may also constitute source data, as discussed hereinafter) may become less accurate and reliable. In this regard, a new or updated data stream is obtained in the form of the subsequent data 20. When analyzed in connection with the initial data 16, the resulting verification data 24 can be used to provide improved track data and an improved track database that can be provided to both the central control system 26 as well as each train T, specifically an on-board controller OBC of each train T. For example, as seen in FIG. 1, an on-board controller OBC is provided on each train in order to centrally control and operate various components and mechanisms associated with the train T.

Figure 2:
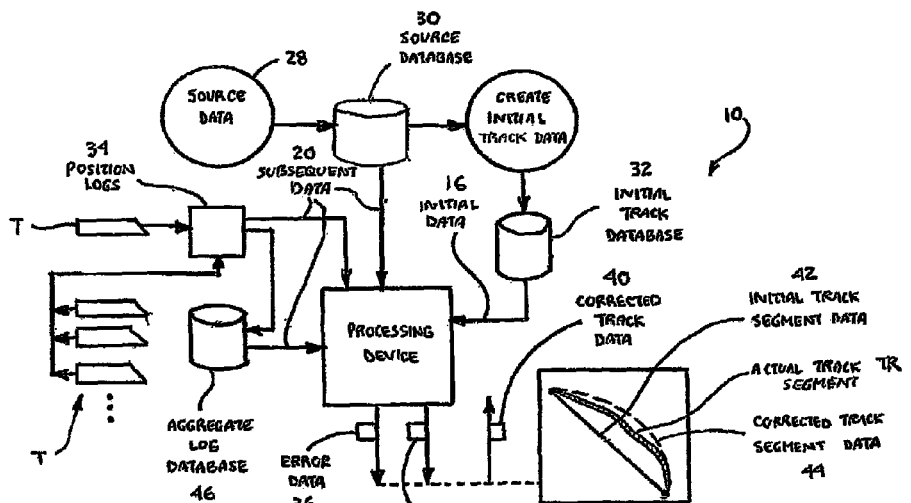
FIG. 2 is a schematic view of another embodiment of a data improvement system and method according to the principles of the present invention.

In another preferred and non-limiting embodiment, and as illustrated in FIG. 2, certain source data 28 is provided to or populated in a source database 30. It is this source data 28 that may have been used to create the initial data 16 populated in the initial database 12. In this embodiment, the initial database 12 is in the form of an initial track database 32, which represents the existing state of the data regarding the trains T or track TR in the track network. Accordingly, it is this initial data 16 that is provided to the processing device 22.

In one embodiment, and as further illustrated in FIG. 2, the subsequent data 20 is also obtained from the source database 30, i.e., the source data 28. In particular, and in this embodiment, the source data 28 represents the Global Positioning System (GPS) inputs from a Geographic Information System (GIS). Further, this embodiment may be implemented in a laboratory or "offline" environment. In operation, these GPS inputs (subsequent data 20) would be provided to the processing device 22 and compared against the initial data 16 derived from the initial database 12, in this embodiment, the initial track database 32. In particular, the processing device 22 includes the appropriate software and program instructions to simulate a train T starting at one end of the track TR or track segment TS that is to be verified or improved. The coordinates of the track TR centerline information are retrieved from the source database 30 and provided to a simulated on-board system, e.g., a laboratory on-board controller OBC. The simulated OBC would include the initial track database 32 and, therefore, the initial data 16. Based upon this comparison, specified verification data 24 is provided.

As further illustrated in FIG. 2, and in connection with this preferred and non-limiting embodiment, the processing device 22 is programmed or configured to determine error data 36 based upon a comparison of initial track data 38 (initial data 16) to the subsequent track data (subsequent data 20) as derived from the source database 30. In particular, this error data 36 is used to create and determine corrected (improved) track data 40.

As further illustrated in FIG. 2, the existing data and determined data are used to improve the accuracy of the track TR position. As shown, the initial track data 38 provides the information on each particular segment of track TR in the form of initial track segment data 42. The processing device 22 uses the subsequent data 20 to determine corrected track segment data 44, such as through the use of the determined error data 36. As seen in FIG. 2, the corrected track segment data 44 is much more accurate than the initial track segment data 42, as compared to the true position of the segment of track TR.

In a further preferred and non-limiting embodiment, the source data 28 may be the same source data 28 that is used in creating the initial track database 32. As discussed hereinafter, and based upon storage and compilation (processing) constraints, it is often preferable to use a minimized and modeled version of the source data 28 to create the information in the initial track database 32. As such, it may be preferable to use this same source data 28 as the subsequent data 20, which leads to greater accuracy and a reduced margin of error. In addition, this may help in determining or diagnosing issues with the modeling or processing system used to create the initial track data 38 in the initial track database 32.

In a further preferred and non-limiting embodiment, the initial track data 38 includes track centerline data in the form of at least one coordinate for a specified position on the track TR. Further, the error data 36 includes a cross track error value. In this manner, the determination performed by the processing device 22 is the comparison of the coordinate of the track centerline data from the initial track data 38 with the coordinate of the track centerline data from the subsequent track data, i.e., the subsequent data 20. A cross track error value is determined from this comparison.

In addition, a configurable error margin is provided for the coordinate or position on the track TR, and this acceptable error margin is then compared against the determined cross track error value. When the cross track error value exceeds this acceptable margin at the specified position on the track TR, the improved information (or corrected track data 40) is maintained for use in establishing a more accurate track database. Of course, it is also envisioned that based upon the simulation, these high-error points may be provided to a user in the form of a report or the like for diagnosing other systemic errors in the overall system. This is the case when using the same source data 28 as the subsequent data 20 that is used in establishing the initial track database 32, since, in theory, there should be no cross track error greater than the error margin used when creating this initial track database 32. Accordingly, the presently-invented system 10 and method can be used to verify that the initial track database 32 was appropriately and correctly derived from the initial source data 28.

In a further preferred and non-limiting embodiment, and as also illustrated in FIG. 2, the subsequent data 20 may be in the form of actual GPS input recorded while the train T is traversing the physical track TR. In particular, and if used in a laboratory environment, this subsequent data 20 would be in the form of position logs 34 that would be obtained from an appropriately-equipped train T, and these position logs 34 are fed into the simulated OBC on the processing device 22. As discussed above, any locations where the cross track error occurs above a specified margin between the subsequent data 20 and the initial data 16 may be corrected and/or flagged for further review. One advantage of this embodiment is that the use of the position logs 34 from the field can serve as additional verification that there are no systemic errors in the information in the initial track database 32 (which is loaded on the on-board controller OBC of the train T). It is further envisioned that the subsequent data (e.g., the source data 28) is associated with a specific position on the track TR or segment of the track TR, and this source data 28 is derived from the position logs 34 that are received on a continual basis, a periodic basis, a predetermined basis, a dynamic basis, a real-time basis, or the like.

As also illustrated in one preferred and non-limiting embodiment of FIG. 2, the subsequent data 20 (or, in one embodiment, the source data 28) may be in the form of multiple position logs 34 collected from multiple trains T traveling on the same track TR, or track segment TS. In particular, and in this embodiment, the subsequent data 20 would be in the form of aggregate position data for the specified position on the track TR or track segment TS. This aggregate position data can be collected, stored, and used to create or establish an aggregate log database 46. Further, the processing device 22 may then be programmed or configured to determine a set or portion of subsequent data 20 based partially upon this aggregate position data for use in determining improved or corrected track data 40.

Figure 3:
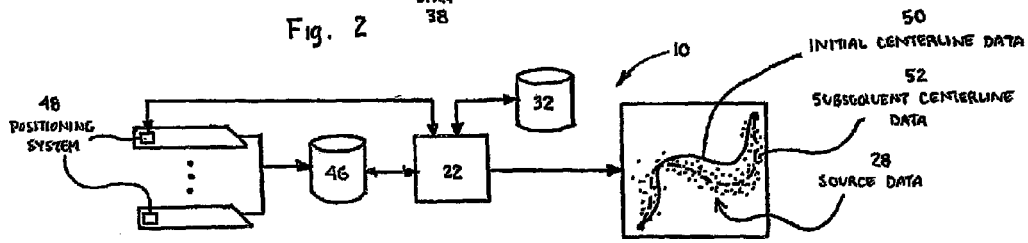
FIG. 3 is a schematic view of a further embodiment of a data improvement system and method according to the principles of the present invention.

As illustrated in FIG. 3, the use of multiple data sets (i.e., the position logs 34 from many different trains T traversing the same segment of track TR) provides for improved and/or corrected track data 40. Since most trains T are equipped with a positioning system 48, such as a GPS receiver and a device to log the GPS coordinates, an aggregate log database 46 can be created and either maintained on board or transmitted to some remote location. Accordingly, it is also envisioned that the positioning system 48 of each train T can be in direct communication with and provide data directly to the processing device 22 (such as some computing device located at a centralized location, e.g., the central control system 26). In any case, and as the trains T travel the track TR, the GPS coordinates are recorded at small, periodic intervals. Thereafter (or dynamically), the position logs 34 are collected at or transmitted from the trains T, and these multiple sets of GPS coordinates are analyzed to find and determine the verification data 24. It is noted that although each individual position log 34 may have certain inaccuracies, the aggregation of multiple sets of these position logs 34 will statistically trend towards accurate information. Therefore, the aggregation of this subsequent data 20 over a specified period of time and across multiple trains TR will lead to a much more accurate "picture" of the position of the track TR or specified track segment TS.

As further illustrated in FIG. 3, the processing device 22 obtains the initial data 16 in the form of initial centerline data 50, as derived from the initial track database 32. Thereafter, the subsequent data 20, which, in this embodiment, is in the form of multiple coordinates obtained from the aggregate log database 46, is used to establish subsequent centerline data 52. As seen in FIG. 3, this subsequent centerline data 52 will provide a much more accurate picture of the track position (whether in the x-, y-, or z- plane).

Figure 4:
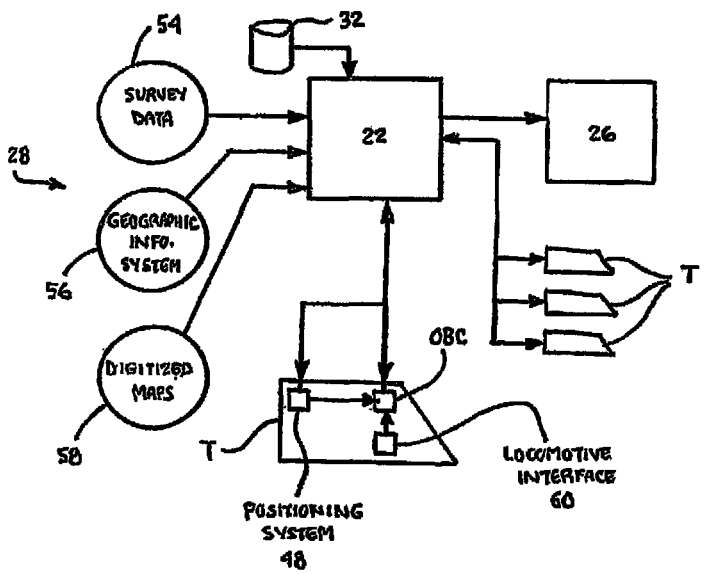
FIG. 4 is a schematic view of another embodiment of a data improvement system and method according to the principles of the present invention.

In a further preferred and non-limiting embodiment, and as seen in FIG. 4 (and as discussed above), the subsequent data 28 can be derived from specified source data 28, which may be in the form of survey data 54, information from a geographic information system 56, information from digitized maps 58, directly or indirectly from the positioning system 48 on the train T, or the like. Accordingly, the on-board controller OBC of the train T may be in communication with one or more locomotive interfaces 60, such as the positioning system 48, for use in creating the source data 28 (or subsequent data 20). This information is provided to or processed by the on-board controller OBC (which may be used as the processing device 22) or provided to a remotely-located processing device 22, such as through the verification database 18. In this embodiment, and as discussed above, the initial data 16 is derived from or obtained through the initial track database 32.

Figure 5:
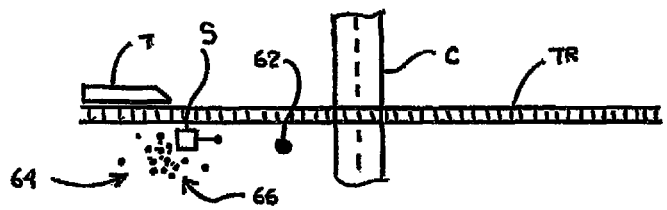
FIG. 5 is a schematic view of an intermediate data collection step in a still further embodiment of a data improvement system and method according to the principles of the present invention.

With continued reference to FIG. 4 and reference to FIG. 5, and in this preferred and non-limiting embodiment, at least a portion of this initial data 16 includes feature initial position data 62. Further, the subsequent data 20 includes feature subsequent position data 64. This feature subsequent position data 64 is at least partially derived from the source data 28 obtained and/or transmitted by the on-board controller OBC. Any locomotive interface 60 that provides such feature information can be used within the presently-invented system 10, such as a receiver, a transceiver, a horn system, a cab signal system, a braking system, a drive system, or the like. Accordingly, the source data 28 may be indicative or representative of a cab signal, horn activation, received data, transmitted data, speed data, braking data, or the like.

In the preferred and non-limiting embodiment of FIG. 5, a signal post S is provided to warn the operator of a train T that a crossing C is upcoming. In order to improve the accurate positioning of either the signal post S or the crossing C, the source data 28 may include horn activation data 66. Again, through the use of multiple instances of horn activation data 66 (which may be populated in the aggregate log database 46 or some similar aggregate database), a more accurate position is obtained. For example, and as seen in FIG. 5, the feature initial position data 62, whether the position of the signal post S or the crossing C, can be improved by understanding and determining the multiple and clustered instances of horn activation data 66. Similarly, the source data 28 may be in the form of cab signal data 68 for use in determining cab signals derived from vital logic V and determination of aspect change points and locations.

Figure 6:
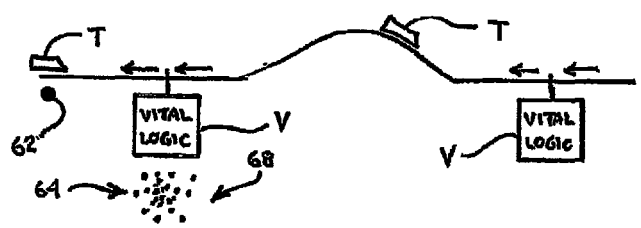
FIG. 6 is a schematic view of another embodiment of a data improvement system and method according to the principles of the present invention.
Figure 6:
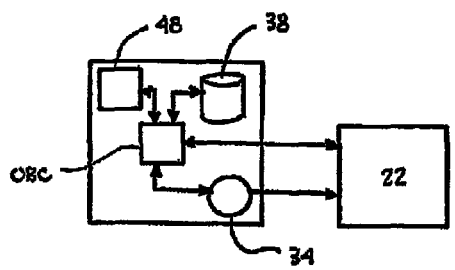

A further preferred and non-limiting embodiment of the presently-invented system 10 and method is illustrated in FIG. 6. In this embodiment, as the trains T traverse the track TR, the position logs 34 are created and include both the GPS locations as well as the determined cross-track errors, as compared with the initial data 16 of the initial track database 32. Accordingly, the system 10 of the present invention can be implemented on each individual or multiple trains T. Thereafter, one or more of these discrete and unique position logs 34 (with corrected information and/or cross-track error values) can be provided to the processing device 22 for use in creating an improved track database.

Such a process may include a comparison between the position from the initial track database 32, the recorded GPS coordinate, and the determined cross track error. In addition, as discussed above, this process may be limited or reduced to only implementing the corrective process when the cross track error exceeds the error margin value. Further, and as also discussed above, the more trains T that are involved in this process, the more accurate the information that is obtained. Further, this process can be run simultaneously and continuously on all trains T traversing the tracks TR, thereby yielding large amounts of source data 28 for use in improving the accuracy of the information and data provided to the central control system 26 and/or the trains T.

Figure 7:
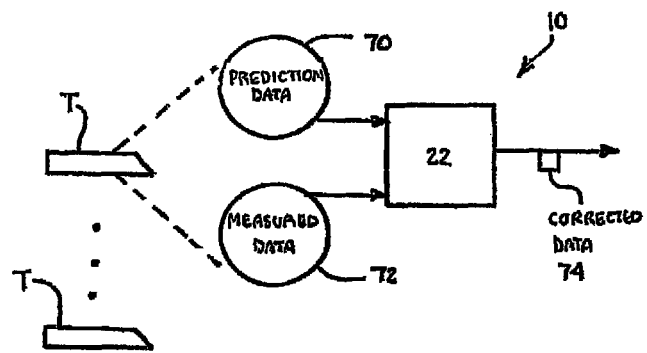
FIG. 7 is a schematic view of a further embodiment of a data improvement system and method according to the principles of the present invention.
Figure 8:
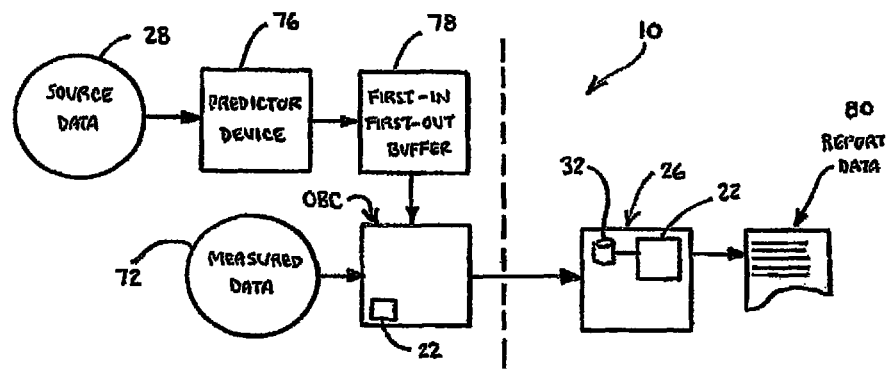
FIG. 8 is a schematic view of another embodiment of a data improvement system and method according to the principles of the present invention.

In a still further preferred and non-limiting embodiment, and as illustrated in FIG. 7, the initial data 16 may include prediction data 70 and the subsequent data 20 includes actual measured data 72. The processing device 22 is programmed or configured to determine error data 36 based upon a comparison of the prediction data 70 and the measured data 72. It is envisioned that this prediction data 70 includes predicted location, predicted position, predicted speed, predicted acceleration, predicted deceleration, predicted performance, predicted stopping position, predicted stopping distance, or the like. Similarly, the actual measured data 72 includes measured location, measured position, measured speed, measured acceleration, measured deceleration, measured performance, measured stopping position, measured stopping distance, or the like. Accordingly, and in this embodiment of the present invention, verification data 24, such as in the form of corrected data 74, is provided and based upon expected operation and actual performance gathered for one or more trains T. In one embodiment, the on-board controller OBC reports the status and differences from expected operation to the processing device 22, preferably in a real-time environment over wireless data links. In addition, the processing device 22 (in communication with some central database or other central data warehouse) receives and causes this information and data from the various trains T to be stored over time, and the processing device 22 may correlate this information by location or other common factors.

In another preferred and non-limiting embodiment, the prediction data 70 and the measured data 72 may include multiple data fields obtained from multiple different vehicles (in one preferred and non-limiting embodiment, trains T), and these multiple data fields are associated with a specified one or grouping of vehicles. Therefore, while illustrated in connection with trains T, the presently-invented system 10 and methods are equally useful with other vehicles and transit systems.

In another preferred and non-limiting embodiment, the prediction data 70 includes predicted acceleration, and the measured data 72 includes measured acceleration. In this manner, the error data 36 is calculated based upon a difference between the predicted acceleration and measured acceleration. In another embodiment, the prediction data 70 includes predicted stopping distance, and the measured data 72 includes measured stopping distance, such that the error data 36 is calculated based upon a difference between the predicted stopping distance and the measured stopping distance. This error data 36 can be used in providing corrected data 74, such as corrected grade data, corrected featured location, corrected track data, corrected train data, and the like. Further, this determined error data 26 may be translated into expected performance data that is correlated to a specific portion or position of the track TR. In particular, the prediction data 70 and measured data 72 may be compared for multiple trains T at a specified portion of the track TR, thereby compiling this expected performance data for these trains T. Next, an expected error margin value may be established based upon the compiled expected performance data for these trains T at the specified portion of the track TR. The identity of any train T where the difference between the prediction data 70 and the actual measured data 72 exceeds the expected error margin value can be logged.

In another preferred and non-limiting embodiment, the processing device 22 compares the prediction data 70 and the measured data 72 for multiple trains T at specified portions of the track TR, and compiles expected performance data for these trains T. Next, an expected error margin value is established based upon the compiled expected performance data for the trains T at the specified portion of the track TR, and an acceptable error margin value is determined. The identity of any train T is logged where the difference between the prediction data 70 and the measured data 72 exceeds the acceptable error margin value.

In general, and in this preferred and non-limiting embodiment, the on-board controller OBC can be used as a predictor device 76 for predicting train T operation based upon the track database, control inputs, current location, etc. The source data 28 is provided to the predictor device 76, and the information is stored in a first-in first-out buffer 78. The measured data 72 is also obtained through the interfaces available to the on-board controller OBC. In this manner, the detection of differences between the previously-predicted operation and the actual operation can be implemented, and the transmission of any detected differences and their associated train T locations and directions can be provided to other components of the system 10, such as the processing device 22.

All this data and information can be provided to the central control system 26 (or some other central repository) for storing and processing the aggregate data of detected differences from multiple trains T. This aggregate data can be used in creating corrected data 74 or for making other determinations, such as correlating information to specific trains T or groups of trains T. For example, the processing device 22 may be used to detect clusters of detected differences at specific locations on the track T. This could be used to examine and correct the information in the track database that is provided to the trains T.

This embodiment of the present invention may also be used to detect individual train T performance. For example, the processing device 22, central control system 26, or other central repository, may collect and/or analyze the detected differences from multiple trains T, including the associated train T identification, locomotive identification, locations, directions, or other train T data. These differences, whether between the initial data 16 in the form of initial train data, initial track data 38, or the like, can be used to detect specific train T or locomotive performance issues. Thereafter, diagnosis and repair of trains T or locomotives, and subsequent maintenance actions, can be implemented. For example, if a train T consistently underperforms, this may lead to a diagnosis of a malfunction, and similarly, if a train T consistently overperforms, this may give rise to an investigation of its operation.

In addition, and in this preferred and non-limiting embodiment, the system 10 may be used to correlate information to train T origination, such as in the detection of systematic errors in weight reporting. For example, the use of the prediction data 70, measured data 72, and other data obtained through the presently-invented system 10, it is possible to identify issues arising from specific origination locations or points. For example, if a mining facility that consistently loads more ore than reported on the train T than is reported to the operator, this would result in a heavier train T than expected. This, in turn, leads to different train performance than expected, and potential safety risks, such as insufficient braking capabilities to safely control a train T as it traverses grades. Similarly, if a train T is consistently being underloaded at any particular origination point, this may also lead to an investigation of the loading techniques and other business issues surrounding such an instance. Accordingly, the presently-invented system 10 and methods are useful in identifying a variety of different issues that may arise in the day-to-day operation of multiple trains T in a complex track TR network.

In addition, the heading may be monitored as derived from the on-board controller OBC, and variations detected from the heading stored in the track database. Locations where the detected heading varies from the stored heading may be identified and reported for later analysis and correction. Incorrect switch locations, curve locations, and other information can also be derived from this process. Further, all of this information can be processed, correlated, formatted; and otherwise provided in the form of report data 80 to a user for use in process improvement and effective train control management.

In another example of this preferred and non-limiting embodiment, if a train T heads east at a particular location and systematically accelerates more slowly than expected, and stops or slows more rapidly than expected, while a train T heading west at the same location accelerates more rapidly than expected, and stops or slows more slowly than expected, this leads to a determination that the grade at that particular location or track segment TS rises more steeply in the eastward direction of travel than the initial track database 32 would indicate. Therefore, the use of this prediction data 70 and measured data 72 is particularly useful in connection with determining errors in grade or contour of the track TR. Correlation by location and processing for systematic errors will reject individual reports that are aberrant for other reasons, such as errors in consist or other train T parameters. Changes to the initial track database 32 may also be correlated by time to allow for the further processing and analysis. As discussed above, other track database characteristics may be improved or corrected, such as curve locations, grade change points, locations of turnouts, and the like, all of which may be detected by correlating the obtained information relating to heading and location. Curvature and heading errors can also be detected by examination of acceleration and deceleration report information and data.

As also discussed above, the use of this prediction data 70 and measure data 72 allows for the detection of deterioration of performance in a specific train T or locomotive over time as it approaches required maintenance. For example, if a train T includes a particular locomotive that accelerates more slowly than expected, it may be concluded that the particular locomotive is developing less tractive power than expected. The present invention allows this detection when the locomotive is operated over time with various train consists or other locomotives. Correlation of these detections over time automatically accounts for maintenance actions performed, and can be used to assist in predicting when maintenance should be performed. Also, as discussed above, similar correlations can be performed to detect rail car characteristics and lading characteristics.

In a still further preferred and non-limiting embodiment of the present invention, the processing device 22 is configured or programmed to analyze the information and data in the initial database 12 and the verification database 18. Some or all of this information can be translated into a readable format for human analysis, such as in connection with the above-described report data 80. As illustrated in the preferred and non-limiting embodiment of FIG. 9, the initial track database 32 includes initial track data 38, and the verification database 18 includes subsequent data 20 in the form of subsequent track data. In this embodiment, the processing device 22, which is in communication with the initial database 12 and the verification database 18, receives a portion or all of the data fields from these databases 12, 18 and determines error data 36 by comparing the initial track data 38 and subsequent data 20.

Figure 9:
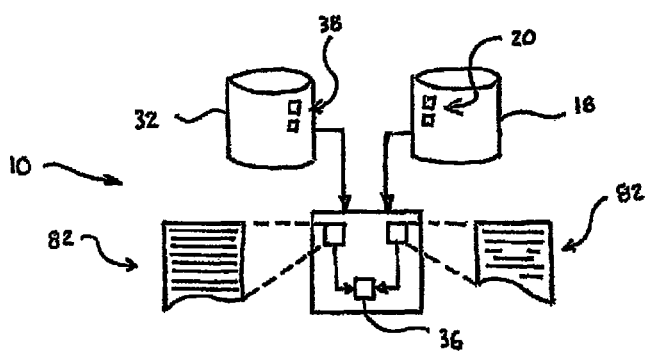
FIG. 9 is a schematic view of a further embodiment of a data improvement system and method according to the principles of the present invention.

As further illustrated in FIG. 9, the processing device 22 is configured or programmed to convert at least a portion of the initial track data 38 and at least a portion of the subsequent data 20 into parseable data 82. In particular, this conversion provides initial track parseable data 84 and subsequent track parseable data 86. This allows for the comparison (whether automated or by a person) between the initial track parseable data 84 and subsequent track parseable data 86.

For example, the initial track parseable data 84 and the subsequent track parseable data 86 may be textual representations of the data in the initial track database 32 and verification database 18. By using a standard text-file comparison or "diff" function, textual differences in the two versions of data can be identified, where the processing device 22 is capable of identifying unexpected or unintended differences or errors. The processing device 22 can also use this comparison to confirm those portions of track data that were expected to be modified or changed were indeed implemented. For example, if a change was made to a track file (or track data), a user can use the processing device 22 to either automatically or controllably determine whether the changes made were as desired, or whether there were any other unexpected changes to the data. This also assists the use in understanding the differences between the initial data 16 and subsequent data 20.

As discussed above, while the source data 28 provides a vast amount of information that can be used in mapping the track TR, it is often not preferable to populate the track database on the on-board controller OBC with all the data. As discussed above, track and position data may be collected by a survey crew. Alternatively, since this survey process is expensive, time-consuming, and may cause delays in rail traffic, the present invention allows for the receipt of data, such as in the form of position logs 34 from a positioning system 48 from one or more trains T. As is known, as a train T travels along the track TR, GPS coordinates are recorded at small, periodic intervals. Later, these GPS logs (or position logs 34) can be collected from the train T, and many sets of these GPS coordinates can be analyzed to find track center line data. As discussed above in detail, while each individual position log 34 may include certain inaccuracies, the aggregation of multiple sets of these position logs 34 will statistically trend towards the most accurate centerline data (or track TR position). Such a collection method reduces interference with railroad operations, since the data collection is done by trains T that would be traveling on the track TR even if they were not collecting data.

In a further embodiment of the presently-invented system 10 and methods, a source database 30 includes multiple data fields representing source data 28, such as track data, identification data, location data, position data, heading data, curvature data, type data, grade data, coordinate data, cross track error data, centerline data, positioning system data, geographic information system data, survey data, log data, dynamic data, batch data, or the like. In this embodiment, the processing device 22 is in communication with this source database 30 and programmed or configured to engage in a trimming process. It should also be noted that this method can be used for creating both the initial track database 32 or for creating or obtaining corrected track data 40 for improving the track database.

Figure 10:
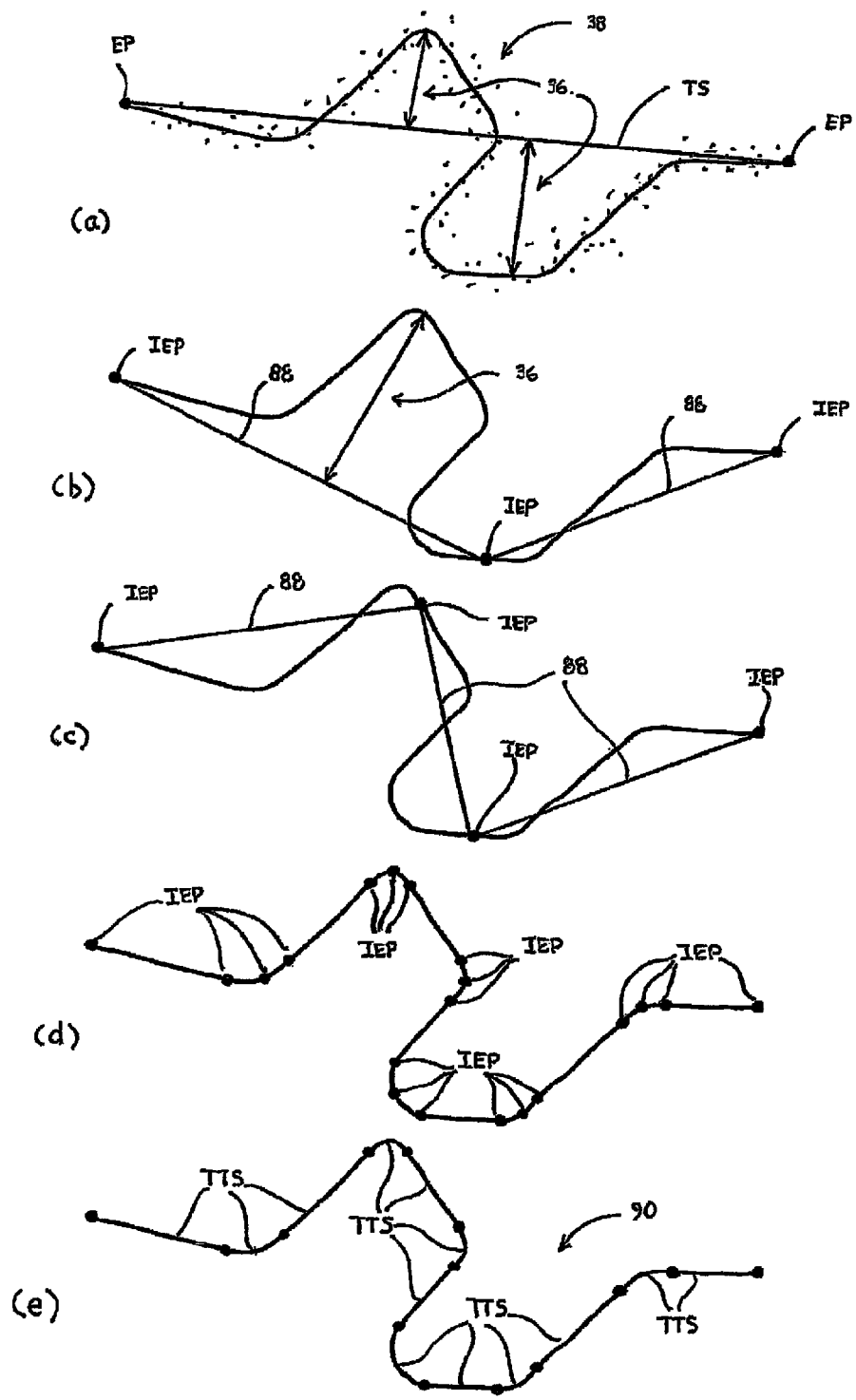
FIGS. 10(a)-(e) are schematic views of certain steps in a still further embodiment of a data improvement system and method according to the principles of the present invention.

As illustrated in FIG. 10, and in this preferred and non-limiting embodiment, the processing device 22 determines initial track data 38 for a specified track segment TS based at least in part upon the source data 28. Each track segment TS includes end points EP, and error data 36 is determined based upon the initial track data 38 and a straight line extending between the end points EP. Further, and as also based upon this error data 36, the processing device 22 creates intermediate segments IS, which are defined as a straight line between intermediate end points IEP. Next, trimming data 90 is determined for at least two of the intermediate end points IEP, thereby defining trimmed track segments TTS. Thereafter, this trimming data 90 and/or trimmed track segments TTS are provided to a track database that is installed on the on-board controller OBC (and/or at the central control system 26). Further, this trimming data 90 may include first end point data, second end point data, coordinate data, heading data, grade data, linear distance data, track type data, or the like. Further, this trimming data 90 may be formatted or arranged in the track database for specific applications or management objectives.

In one example, the initial track data 38 or source data 28 of the track centerline is stored as a series of coordinates, and the heading of the track TR at those points. Accordingly, the presently-invented system 10 and methods allow for the processing of a series of track points and finding an efficient, i.e., small, set of heading points that accurately models the track TR to within a configurable error margin. A heading point is created at the beginning and end of each track segment TS, and if the entire track segment TS falls within the error margin, the process may be completed.

As illustrated in FIG. 10, if error above the margin is identified, an additional heading point (including position and heading) is created. This process of placing an additional point at the point with the greatest error is repeated until all of the heading points model the track segment TS to within the error margin. Once all the heading points are determined, the track TR can then be divided into segments of tangent, curve, or spiral track TR. The heading of the cord across curved track, and the heading that is tangent to a straight or curved track, can be determined by the location of neighboring heading points. Once all heading points are calculated, they can be reduced (or trimmed) to a set of points that contains only the end points of curved, tangent, or spiral track.

In this manner, the processing method described herein reduces the numbers of required heading points, helps suppress noise in the raw data (or source data 28), and gives accurate modeling of the track TR to within an easily-configurable error margin. It is also noted that the grade component, i.e., profile view, of the track TR can be used as well in this process, with a similar algorithm applied to divide the track TR into segments of constant grade. The track grade can then be stored as segments having a constant grade, or as elevation points at the ends of those segments. This trimming data 90 may be considered as a reduced data set, including the end points of the trimmed track segment TTS, the GPS coordinate (latitude, longitude, or ECEF), heading, and offset (linear distance from the beginning of the segment or block). As discussed above, the track database provided using this trimming data 90 can be formatted in a variety of desired configurations, e.g., a PTC on-board track database, an XML-formatted track reference, office track data, asset tracking data, etc. Further, the centerline data may be included as an optional feature list.

As illustrated in FIG. 10, this iterative process is illustrated starting with a straight line between the end points EP, and the initial track data is processed or modeled to define the intermediate end points IEP for defining the track TR in the x-, y-, and/or z-vectors. This process is based upon the source data 28, which establishes the centerline for use in adjusting from the straight line between the end points EP. Accordingly, FIGS. 10(a)-(d) illustrate the modeling process that provides new intermediate end points IEP for defining the track TR. However, while these intermediate end points IEP represent a smaller data set than the source data 28, e.g., the raw GPS data from the position logs 34, it may still be considered to be too many points for certain applications. Therefore, and as shown in FIG. 10(e) this intermediate data set can be trimmed and provide the trimming data 90, which, as discussed above, includes the minimum amount of information for defining each trimmed track segment TTS.

In one aspect of this embodiment of the present invention, the system 10 and method takes a counter-intuitive approach of not requiring track centerline data to be stored in the track database. This allows for the same track database model to be used for train control systems as well as other systems, such as by using the above-discussed optional feature list. For example, an asset-tracking system might be designed that reports the status when the train T enters a certain geographic area. The track centerline data feature list would not be required to provide such a function, but instead a feature list describing specific geographic areas may be included instead. Such an approach allows for a great deal of flexibility by providing a variety of systems that can use data from the same model, which allows the re-use of software libraries. In addition, this embodiment allows for the conservation of storage space when appropriate, such as not providing the centerline data (or other large data sets) when it is not necessary or when storage space is limited.

Figure 11:
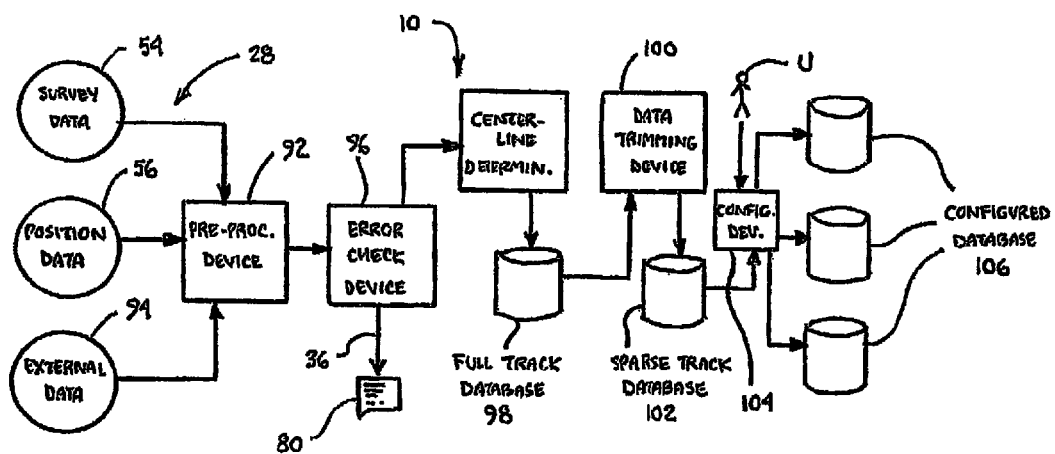
FIG. 11 is a schematic view of another embodiment of a data improvement system and method according to the principles of the present invention.

In a further preferred and non-limiting embodiment, and as illustrated in FIG. 11, the presently-invented system 10 and methods allow for a unique data trimming and processing methodology. As seen in the embodiment of FIG. 11, a pre-processing device 92 receives survey data 54, position data 56, or other external data 94. This pre-processing device 92 interpolates a centerline from this raw source data 28. This information is then communicated to an error check device 96, which checks and analyzes the information for errors, optionally providing this error data 36 to a user in the form of report data 80. In this manner, the user may correct or confirm the error data 36.

Next, a device, such as the processing device 22, makes centerline determinations and/or completes heading points using an error algorithm (as described above). This information and data is provided to a full track database 98, and further provided to a data trimming device 100. As described above, this data trimming device 100 provides trimming data 90 including a subset of the data in the full track database 98 that is still capable of accurately describing the track TR position or location. This trimming data 90 is then provided to a sparse track database 102, which is in communication with a configuration device 104. The configuration device 104 is configured or programmed to output the track data (or trimming data 90) in any desired format.

As further illustrated in FIG. 11, a user may select the desired type of output for population and creation of one or more configured databases 106, such as the above-described asset tracking database, PTC database, etc. Therefore, the presently-invented system 10 and methods also provide the unique ability to analyze, manipulate, model, and output track data to meet any desired application. Further, it is also envisioned that any of the above-described devices, e.g., the pre-processing device 92, the error check device 96, the data trimming device 100, the configuration device 104, etc., may be in the form of or integrated with the processing device 22. Further, any of these devices may be a computing device or a computer specially programmed or operable to effectively implement the described steps and functions.

Still further, the above-described embodiment allows for the user control of the creation and population of the configured databases 106. For example, the user may interact with the appropriate interface and allow the trimming data 90 to be output in any selected format. Further, since validation and error checking is performed within the system 10, such error checking is more consistently reliable. In addition, since the user's effort to generate multiple track output formats is minimal, much less time is spent generating track output than would otherwise be required.

In this manner, the present invention provides a data improvement system 10 and methods that address many deficiencies and drawbacks evident in the existing systems in the railroad industry. The present invention also provides for the creation of initial track or train data, as well as improved or corrected data based upon such initial data. In addition, the presently-invented system 10 and methods provide improved and accurate data for use in a variety of train-related applications and environments.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A track database data improvement system, comprising:
a source database comprising a plurality of data fields representing source data, which includes at least one of the following: track data, identification data, location data, position data, heading data, curvature data, type data, grade data, coordinate data, cross track error data, centerline data, positioning system data, geographic information system data, survey data, log data, dynamic data, batch data, or any combination thereof; and
a processing device in communication with the source database and programmed or configured to:
determine initial track data for a specified segment of track based at least in part upon the source data, the segment having end points;
determine error data based upon the initial track data and a straight line between the end points, and create intermediate segments as defined as a straight line between intermediate end points;
determine trimming data for at least two of the intermediate end points, thereby defining trimmed track segments; and
provide at least a portion of the trimming data to a track database;
wherein the trimming data includes at least one of the following: first end point data, second end point data, coordinate data, heading data, grade data, linear distance data, track type data, or any combination thereof.

2. The system of claim 1, wherein at least a portion of trimming data from the track database is transmitted to at least one of the following: a train, a central control system, a central track database, or any combination thereof.

3. The system of claim 1, wherein the processing device is further configured to format or arrange the trimming data in the track database, thereby providing formatted data.

4. The system of claim 1, wherein at least a portion of the initial track data comprises a plurality of coordinates, each defining at least one point, and the heading of the track at the at least one point.

5. The system of claim 4, wherein the processing device is further programmed or configured to, based at least partially on the plurality of coordinates, determine a set of heading points for a segment of track.

6. The system of claim 5, wherein the set of heading points comprises a heading point at the beginning of the segment of track and a heading point at the end of the segment of track.

7. The system of claim 5, wherein the processing device is further programmed or configured to, based at least partially on the set of heading points, determine whether the set of heading points is within a specified error margin.

8. The system of claim 7, wherein the processing device is further programmed or configured to create at least one additional heading point if the set of heading points is outside the specified error margin.

9. The system of claim 8, wherein the processing device is further programmed or configured to create the at least one additional heading point at a point that is the furthest outside the specified error margin.

10. The system of claim 9, wherein the processing device is further programmed or configured to repeat the creation step until all of the heading points in the set of heading points are within the specified error margin.

11. The system of claim 5, wherein the processing device is further programmed or configured to separate the track into a plurality of track segments, comprising at least one of the following: a tangent segment, a curve segment, a spiral segment, a straight segment, or any combination thereof.

12. The system of claim 11, wherein the trimming data comprises at least one end point of at least one of the following: a tangent segment, a curve segment, a spiral segment, a straight segment, or any combination thereof.

13. The system of claim 1, wherein at least a portion of the initial track data comprises a plurality of coordinates, each defining at least one point, and the grade of the track at the at least one point.

14. The system of claim 13, wherein the processing device is further programmed or configured to, based at least partially on the plurality of coordinates, determine a set of grade points for a segment of track.

15. The system of claim 14, wherein the set of grade points comprises a grade point at the beginning of the segment of track and a grade point at the end of the segment of track.

16. The system of claim 14, wherein the processing device is further programmed or configured to, based at least partially on the set of grade points, determine whether the set of grade points is within a specified error margin.

17. The system of claim 16, wherein the processing device is further programmed or configured to create at least one additional grade point if the set of grade points is outside the specified error margin.

18. The system of claim 17, wherein the processing device is further programmed or configured to create the at least one additional grade point at a point that is the furthest outside the specified error margin.

19. The system of claim 18, wherein the processing device is further programmed or configured to repeat the creation step until all of the grade points in the set of grade points are within the specified error margin.

20. The system of claim 14, wherein the processing device is further programmed or configured to separate the track into a plurality of track segments, comprising at least one of the following: a constant grade, an elevation point, an elevation area, or any combination thereof.

21. The system of claim 20, wherein the trimming data comprises elevation data associated with at least one end point of a specified track segment.

22. A computer-implemented track data improvement method, comprising:
- on at least one computer in communication with at least one source database comprising a plurality of data fields representing source data, which includes at least one of the following: track data, identification data, location data, position data, heading data, curvature data, type data, grade data, coordinate data, cross track error data, centerline data, positioning system data, geographic information system data, survey data, log data, dynamic data, batch data, or any combination thereof;
- determining initial track data for a specified segment of track based at least in part upon the source data, the segment having end points;
- determining error data based upon the initial track data and a straight line between the end points, and create intermediate segments as defined as a straight line between intermediate end points;
- determining trimming data for at least two of the intermediate end points, thereby defining trimmed track segments; and
- providing at least a portion of the trimming data to a track database, wherein the trimming data includes at least one of the following: first end point data, second end point data, coordinate data, heading data, grade data, linear distance data, track type data, or any combination thereof.

* * * * *